United States Patent Office 2,992,242
Patented July 11, 1961

2,992,242
NEW STEROIDS OF THE OESTRANE SERIES NON-OXYGENATED IN THE 3-POSITION
Stefan Antoni Szpilfogel and Cornelis Maurits Siegmann, Oss, Netherlands, assignors to Organon Inc., Orange, N.J., a corporation of New Jersey
No Drawing. Filed July 21, 1958, Ser. No. 749,621
Claims priority, application Netherlands Aug. 6, 1957
3 Claims. (Cl. 260—397.3)

The invention relates to biologically active $\Delta^{5(10)}$ compounds of the oestrane series not oxygenated in 3-position and to the preparation thereof.

More particularly it relates to novel $\Delta^{5(10)}$-oestrene compounds of the general formula:

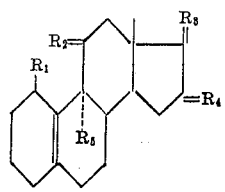

in which $R_1$ is selected from the group consisting of hydrogen and a methyl group.

$R_2$ is selected from the group consisting of $H_2$, $H(OH)$ and O.

$R_3$ is selected from the group consisting of $\alpha X(\beta Y)$ and O, in which X is selected from the group consisting of hydrogen and an alkyl radical containing from 1 to 6 carbon atoms and Y is selected from the group consisting of a hydroxyl group and an acyloxy group derived from a carboxylic acid containing from 1 to 12 carbon atoms.

$R_4$ is selected from the group consisting of $\beta H(\alpha Y)$ and O in which Y has the meaning as defined above.

$R_5$ is selected from the group consisting of hydrogen and a halogen atom.

These novel compounds exert strongly gonad-inhibiting effects.

These novel compounds also have progestative, oestrogenic, and hypophyse-inhibiting properties.

The process according to the invention is characterized in that hydrochloric acid is added to the double bond of a $\Delta^4$-oestrene compound of the general formula:

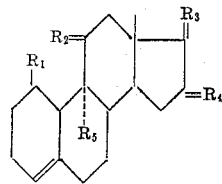

in which $R_3$ is selected from the group consisting of H(OH), H(OAc) and O, in which Ac represents an acyl group derived from a carboxylic acid containing from 1 to 12 carbon atoms, and $R_1$, $R_2$, $R_4$ and $R_5$ have the meaning as defined above, after which the thus obtained saturated 5-chloro compound is treated with a basically reacting, dehydro-halogenating agent, after which, if desired, the thus obtained $\Delta^{5(10)}$-oestrene compounds are converted—in a manner known per se—into the corresponding 17$\beta$-hydroxy-17$\alpha$-alkyl compounds, and/or esterified to the 17-hydroxyl group, if desired.

The $\Delta^4$-oestrene compounds, which are not oxygenated in 3-position, to be used as starting products in the present process, may be prepared according to the method described in the United States patent application Ser. No. 654,454. According to this method a $\Delta^{1,3,5}$-oestratriene compound, which has an etherified hydroxyl group in 3-position, is reacted with an alkali metal in the presence of a lower aliphatic primary amine.

The present starting products may also be prepared by reacting a $\Delta^4$-19-nor-androstene compound, which has an etherified or esterified hydroxyl group in 3-position, with an alkali metal in the presence of liquid ammonia or of a lower aliphatic primary amine (see U.S. patent application Ser. No. 728,784, now Patent No. 2,878,267).

As examples of starting substances are mentioned by name $\Delta^4$-17-hydroxy-oestrene, $\Delta^4$-17-keto-oestrene, $\Delta^4$-16,17-dihydroxy-oestrene, $\Delta^4$-16 - keto - 17-hydroxy-oestrene, $\Delta^4$-16,17-diketo-oestrene, $\Delta^4$-1-methyl-17-hydroxy-oestrene, $\Delta^4$-1-methyl-17-keto-oestrene, $\Delta^4$-11,17-diketo-oestrene, $\Delta^4$-11$\beta$-hydroxy - 17 - keto-oestrene, $\Delta^4$-11$\beta$,17-dihydroxy-oestrene, $\Delta^4$-11-keto-17-hydroxy-oestrene, $\Delta^4$-11$\beta$,17-dihydroxy-9$\alpha$-fluoro-oestrene, $\Delta^4$-11,17-diketo-9$\alpha$-fluoro-oestrene, $\Delta^4$-9$\alpha$-fluoro-11-keto-17-hydroxy-oestrene, and functional derivatives of these compounds.

The addition of hydrochloric acid to the double bond of the starting substance takes place by treatment of the $\Delta^4$-oestrene compound with hydrochloric acid in the presence of a solvent. The addition reaction may for example be carried out by dissolving the oestrene compound in an organic liquid and subsequently leading hydrochloric acid gas through this solution for some time. It is also possible to dissolve the starting substance in a solvent saturated with hydrochloric acid and leaving this solution to stand at a suitable temperature for some time.

As solvents may for example be used a lower aliphatic ether, such as dimethyl ether, methyl ether, diethyl ether, further dioxane, tetrahydrofurane, and halogenated hydrocarbons, such as carbon tetra chloride, chloroform, methylene chloride, and the like.

The corresponding 5-chloro-oestrane compound obtained after the addition reaction can be isolated from the reaction mixture according to a conventional method and may then be purified, for example by extraction, crystallization or chromatography.

The resulting 5-chloro-oestrane compound is subsequently treated with a basically reacting, dehydro halogenating agent, if necessary in the presence of an organic solvent. As dehydro halogenating agents may be used a tertiary amine, for example collidine, or dimethyl aniline or a metal hydroxide, such as sodium, potassium, or magnesium hydroxide. Preferably a metal hydroxide is used.

The corresponding $\Delta^{5(10)}$-oestrene compound can be isolated from the mixture of oestrene compounds obtained after the dehydro halogenation by means of a conventional method. Preferably the desired compound is isolated by extraction, evaporating the extract to dryness and a subsequent fractional crystallization of the drying residue.

Subsequently, the thus prepared $\Delta^{5(10)}$-oestrene compounds can be converted into the corresponding 17-hydroxy-17-alkyl-oestrene compounds by addition of a metallic derivative of a saturated hydrocarbon to the 17-keto group of a $\Delta^{5(10)}$-17-keto compound of the oestrane series.

The $\Delta^{5(10)}$-17-keto-oestrene compounds can be prepared by applying the above described process to $\Delta^4$-17-keto-oestrene compounds, or by oxidation of the $\Delta^4$-17-hydroxy-oestrene compounds likewise to be obtained in this manner.

The saturated hydrocarbon to be added is an alkane with 1-6 carbon atoms, e.g. methane, ethane, propane, isopropane, butane, pentane, isopentane and hexane.

The desired 17-hydroxy-17-alkyl compound can be obtained from the reaction mixture, after hydrolysis, according to a method known per se, such as crystallization or chromatography.

The resulting unesterified 17-hydroxy compounds can be esterified, if desired, at the 17-hydroxy group with an aliphatic, aromatic, or araliphatic carboxylic acid, e.g. acetic acid, propionic acid, butyric acid, valeric acid, capronic acid, isocapronic acid, decanoic acid, undecylenic acid, succinic acid, tartaric acid, cyclopentyl acetic acid, $\beta$-cyclopentylpropionic acid, cyclohexyl acetic acid, $\gamma$-cyclohexyl butyric acid, phenyl acetic acid, $\beta$-phenylpropionic acid, benzoic acid, glycine, alanine and phenylalanine.

The following examples serve to illustrate but are not intended to limit the present invention.

*Example Ia*

A solution of 30 g. of HCl-gas in 100 ml. of absolute ether is added to a solution of 1.0 g. of $\Delta^4$-17-keto-oestrene in 100 ml. of absolute ether. The reaction mixture is left to stand at room temperature for 48 hours and is subsequently poured into 250 ml. of ice water. The water layer is then separated and extracted two times with ether. The collected ether extracts are added to the remaining ether layer, after which the ethereal solution is washed with a dilute solution of sodium bicarbonate in water, subsequently with water, then dried on sodium sulphate and finally evaporated to dryness under reduced pressure. The residue is dissolved in methylene chloride, after which the solution is treated with norit and then evaporated to dryness under reduced pressure. The residue is taken up in ether. From this solution 0.83 g. of 5-chloro-17-keto-oestrane crystallizes of melting-point 180–190° C.

Both the crystallisate and the mother-liquor may be used for further processing.

*Example Ib*

0.83 g. of 5-chloro-17-keto-oestrane is dissolved in 125 ml. of 96% ethanol, after which 42 ml. of a 2N sodium hydroxide solution in water are added to this solution. The reaction mixture is refluxed for 90 minutes, then cooled and subsequently poured into 750 ml. of water. The aqueous mixture is extracted three times with methylene chloride, after which the collected extracts are washed with water. The solution is subsequently dried on sodium sulphate and evaporated to dryness under reduced pressure.

The residue is dissolved in petroleum ether and the resulting solution is filtered over 3.6 g. of aluminium oxide. The eluate is evaporated to dryness under reduced pressure. The residue is taken up in petroleum ether, after which the $\Delta^{5(10)}$-17-keto-oestrene crystallizes herefrom. The melting-point amounts to 120–127° C.; $(\alpha)_D = +283°$ (in chloroform).

In an analogous manner the $\Delta^4$-11,17-diketo-oestrene, $\Delta^4$-11$\beta$-hydroxy-17-keto-oestrene and the $\Delta^4$-11,17-diketo-9$\alpha$-fluoro-oestrene have been converted into the corresponding $\Delta^{5(10)}$-oestrene compounds.

*Example II*

To a solution of 2.0 g. methyl magnesium bromide in 200 ml. of ether is added a solution of 4.1 g. of $\Delta^{5(10)}$-17-keto-oestrene in 150 ml. of absolute ether. This mixture is refluxed for 2 hours. Subsequently 50 ml. of water which contains 20 ml. of concentrated hydrochloric acid are added to the mixture, after which the latter is stirred vigorously. Then the ether layer is separated, dried over sodium sulphate and finally evaporated to dryness. By recrystallization of the residue from a mixture of ethyl acetate and petroleum ether, the $\Delta^{5(10)}$-17$\beta$-hydroxy-17$\alpha$-methyl-oestrene is obtained.

Analogous to the process described before the $\Delta^{5(10)}$-17-keto-oestrene has been converted—by means of propyl magnesium bromide, resp. pentyl magnesium chloride—into $\Delta^{5(10)}$-17$\beta$-hydroxy-17$\alpha$-propyl-oestrene, resp. $\Delta^{5(10)}$-17$\beta$-hydroxy-17$\alpha$-pentyl-oestrene.

In a corresponding manner the $\Delta^{5(10)}$-11,17-diketo-oestrene and the $\Delta^{5(10)}$-11$\beta$-hydroxy-17-keto-oestrene have been converted into the corresponding 17$\beta$-hydroxy-17$\alpha$-ethyl-, and 17$\beta$-hydroxy-17$\alpha$-butyl-compounds.

The $\Delta^{5(10)}$-11,17-diketo-9$\alpha$-fluoro-oestrene has been converted into the corresponding 17$\beta$-hydroxy-17$\alpha$-hexyl compound.

*Example III*

A solution of 1 g. of $\Delta^{5(10)}$-17$\beta$-hydroxy-17$\alpha$-methyl-oestrene, 5 ml. of pyridine and 4 ml. of acetic acid anhydride is heated at 100° C. for 1 hour. The solution is then evaporated to dryness in vacuo, after which the residue is taken up in a mixture of acetone and petroleum ether. By crystallization the $\Delta^{5(10)}$-17$\beta$-acetoxy-17$\alpha$-methyl-oestrene is obtained herefrom.

In a corresponding manner the $\Delta^{5(10)}$-17$\beta$-hydroxy-17$\alpha$-methyl-oestrene, and the $\Delta^{5(10)}$-17$\beta$-hydroxy-17$\alpha$-pentyl-oestrene have been converted into the corresponding 17-esters derived from butyric acid, decanoic acid, cyclohexyl acetic acid and $\beta$-phenylpropionic acid.

In a corresponding manner the $\Delta^{5(10)}$-11-keto-17$\beta$-hydroxy-17$\alpha$-ethyl-oestrene and the $\Delta^{5(10)}$-11-keto-9$\alpha$-fluoro-17$\beta$-hydroxy-17$\alpha$-hexyl-oestrene have been converted into the 17-acetates, 17-undecylenates, 17-cyclopentylpropionates and the 17$\beta$-phenylpropionates. Further the $\Delta^{5(10)}$-17$\beta$-hydroxy-17$\alpha$-propyl-oestrene, the $\Delta^{5(10)}$-11$\beta$,17$\beta$-dihydroxy-17$\alpha$-butyl-oestrene and the $\Delta^{5(10)}$-11$\beta$,17$\beta$-dihydroxy-17$\alpha$-ethyl-oestrene have been converted into the corresponding 17-esters derived from acetic acid, valeric acid, succinic acid and $\beta$-phenylpropionic acid.

*Example IVa*

To a solution of 1.2 g. $\Delta^4$-16$\alpha$-hydroxy-17-keto-oestrene in 100 ml. of absolute ether is added a solution of 31.5 g. of HCl gas in 100 ml. of absolute ether. This reaction mixture is further treated as described in Example Ia, after which a residue is obtained. This residue is twice crystallized from ether as a result of which is obtained 0.62 g. of the 5-chloro-16$\alpha$-hydroxy-17-keto-oestrane.

*Example IVb*

0.62 g. of 5-chloro-16$\alpha$-hydroxy-17-keto-oestrane is dissolved in 1.1 ml. of dimethyl aniline. This solution is refluxed for 45 minutes, after which it is poured into 1.5 l. of 2 N hydrochloric acid. This mixture is extracted with chloroform. The chloroform layer is separated, washed with a solution of sodium bicarbonate in water, then with water, subsequently dried on sodium sulphate, and finally evaporated to dryness under reduced pressure. The residue is further treated as described in Example Ib, after which the $\Delta^{5(10)}$-16$\alpha$-hydroxy-17-keto-oestrene is obtained.

In a corresponding manner the $\Delta^4$-1-methyl-17-keto-oestrene and the $\Delta^4$-9$\alpha$-fluoro-11$\beta$-hydroxy-17-keto-oestrene have been converted into the corresponding $\Delta^{5(10)}$-oestrene compounds.

*Example V*

To a mixture of 10 ml. of absolute ether 0.9 g. of magnesium, a mixture of 1.4 ml. of proylbromide and 1.4 ml. of absolute ether is added in nitrogen atmosphere.

Subsequently a solution of 0.95 g. of $\Delta^{5(10)}$-16$\alpha$-hydroxy-17-keto-oestrene in 15 ml. of absolute ether is added to this reaction mixture, after which the whole is stirred for 4 hours. Then the reaction mixture is poured into acidified ice-water. The aqueous mixture is extracted with ether, the ether layer is separated, washed with water, dried over sodium sulphate and evaporated to dryness. The residue is crystallized from a mixture of ether and petroleum ether, giving the $\Delta^{5(10)}$-16$\alpha$,17$\beta$-dihydroxy-17$\alpha$-propyl-oestrene.

In a corresponding manner the $\Delta^{5(10)}$-16$\alpha$-hydroxy-17-keto-oestrene has been converted into the corresponding 17$\beta$-hydroxy-17$\alpha$-methyl-, and 17$\beta$-hydroxy-17$\alpha$-pentyl-oestrene compounds.

Analogous to this process the $\Delta^{5(10)}$-1-methyl-17-keto-oestrene has been converted into the corresponding 17$\beta$- hydroxy-17α-ethyl-oestrene compound. Further the Δ⁵⁽¹⁰⁾-9α-fluoro-11β-hydroxy-17-keto-oestrene has been converted into the corresponding 17β-hydroxy-17α-isopropyl-, and 17β-hydroxy-17α-hexyl-oestrene compounds.

Example VI

A solution of 0.4 g. of Δ⁵⁽¹⁰⁾-16α,17β-dihydroxy-17α-methyl-oestrene in 2.6 g. of acetic anhydride and 3.5 g. of pyridine is heated on a steam-bath for one hour in nitrogen atmosphere and then poured into ice-water. The precipitate is separated and then crystallized from a mixture of methanol and petroleum ether, after which the Δ⁵⁽¹⁰⁾-16α,17β-diacetoxy-17α-methyl-oestrene is obtained.

In a corresponding manner the 16,17-diesters of this compound have been prepared derived from propionic acid, capronic acid, nonane carboxylic acid, t-butyl acetic acid and β-phenylpropionic acid. Further the 16,17-diesters of Δ⁵⁽¹⁰⁾-16α,17β-dihydroxy-17α-propyl-oestrene and Δ⁵⁽¹⁰⁾-16α,17β-dihydroxy-17α-pentyl-oestrene have been prepared derived from acetic acid, trimethyl acetic acid and β-phenyl-propionic acid.

In a corresponding manner the 17-acetates, 17-valerates and 17-succinates have been prepared of Δ⁵⁽¹⁰⁾-1-methyl-17β-hydroxy-oestrene, and Δ⁵⁽¹⁰⁾-9α-fluoro-11β,17β-dihydroxy-17α-isopropyl-oestrene.

Example VIIa

A solution of 60 g. of HCl gas in 200 ml. of absolute ether is added to a solution of 2.0 g. of Δ⁴-11-keto-17β-hydroxy-oestrene in 200 ml. of absolute ether. The reaction mixture is left to stand at room temperature for 2 days, after which it is further treated as described in Example Ia. Obtained is the 5-chloro-11-keto-17β-hydroxy-oestrane.

Example VIIb 1.86 g. of 5-chloro-11-keto-17β-hydroxy-oestrane are dissolved in 250 ml. of methanol, after which 85 ml. of a 2 N potassium hydroxide solution in water are added. The reaction mixture is refluxed for 2 hours, then cooled, and poured into 1.5 l. of water. The aqueous mixture is extracted three times with methylene chloride, after which the collected extracts are washed with water. The solution is subsequently dried on sodium sulphate and evaporated to dryness under reduced pressure.

The residue is dissolved in petroleum ether, after which this solution is filtered over 8 g. of aluminium oxide. The eluate is evaporated to dryness, after which the residue is dissolved in petroleum ether. From this ethereal solution the Δ⁵⁽¹⁰⁾-11-keto-17β-hydroxy-oestrene crystallizes out.

The mother liquors may again be treated with HCl, in which the 5-chloro-11-keto-17β-hydroxy-oestrane stated in Example VIIa is obtained which may be converted into the corresponding Δ⁵⁽¹⁰⁾ compound in the manner as described above.

Analogous to the process described in this example the Δ⁴-11β,17-dihydroxy-9α-fluoro-oestrene, Δ⁴-16-keto-17-hydroxy-oestrene and the Δ⁴-11β,17-dihydroxy-oestrene have been converted into the corresponding Δ⁵⁽¹⁰⁾-oestrene compounds.

Esterification of the Δ⁵⁽¹⁰⁾-11-keto-17β-hydroxy-oestrene and the Δ⁵⁽¹⁰⁾-11β,17-dihydroxy-9α-fluoro-oestrene yields the 17-esters, derived from acetic acid, decanoic acid and γ-cyclohexylbutyric acid.

In the same manner the Δ⁵⁽¹⁰⁾-16-keto-17-hydroxy-oestrene and the Δ⁵⁽¹⁰⁾-11β,17-dihydroxy-oestrene have been converted into the 17-esters derived from propionic acid, t-butyl acetic acid, undecylenic acid and β-phenyl-propionic acid.

Example VIIIa

A solution of 1.0 g. of Δ⁴-17β-hydroxy-oestrene in 100 ml. of absolute ether is added to a solution of 30 g. of HCl gas in 100 ml. of absolute ether. The reaction mixture is further treated as described in Example Ia, after which 1.3 g. of drying residue are obtained. This residue is dissolved in methylene chloride, after which this solution is treated with norit and then evaporated to dryness under reduced pressure. The residue is taken up in ether, from which 0.5 g. of 5-chloro-17β-hydroxy-oestrane crystallizes. The melting-point hereof is 149–153° C.

Example VIIIb 0.5 g. of 5-chloro-17β-hydroxy-oestrane is dissolved in 9 ml. of collidine. This solution is refluxed for 30 minutes, after which it is poured into 2 l. of 2 N sulphuric acid. This mixture is extracted three times with chloroform. The collected chloroform extracts are washed with a solution of sodium bicarbonate in water, then with water, subsequently dried on sodium sulphate, and finally evaporated to dryness under reduced pressure. The residue is further treated as described in Example Ib, after which the Δ⁵⁽¹⁰⁾-17β-hydroxy-oestrene is obtained. The melting-point amounts to 101–103° C. (α)_D=+172° (in chloroform).

In a corresponding manner the Δ⁴-16,17-dihydroxy-oestrene, the Δ⁴-1-methyl-17-hydroxy-oestrene and the Δ⁴-9α-fluoro-11-keto-17-hydroxy-oestrene have been converted into the corresponding Δ⁵⁽¹⁰⁾-oestrene compounds.

The Δ⁵⁽¹⁰⁾-17-hydroxy-oestrene and the Δ⁵⁽¹⁰⁾-9α-fluoro-11-keto-17-hydroxy-oestrene have been converted — in accordance with the process described in Example III — into the 17-esters derived from acetic acid, valeric acid, isocapronic acid, benzoic acid and β-phenyl propionic acid.

In the same manner the Δ⁵⁽¹⁰⁾-16,17-dihydroxy-oestrene has been esterified into the 16,17-diacetate, 16,17-dicapronate, 16,17-dioenanthate and 16,17-dicyclopentyl propionate. Further the Δ⁵⁽¹⁰⁾-1-methyl-17-hydroxy-oestrene has been converted into the 17-esters derived from propionic acid, succinic acid and β-phenylpropionic acid.

We claim:
1. Process for the preparation of Δ⁵⁽¹⁰⁾-oestrene compounds of the formula:

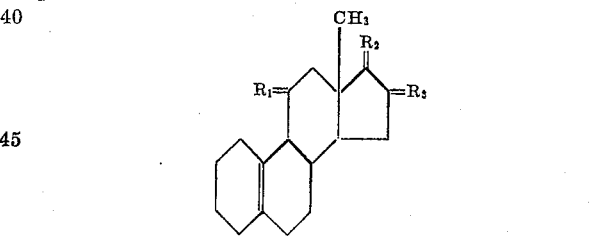

wherein $R_1$ is selected from the group consisting of $H_2$, H(βOH), and O; $R_2$ is selected from the group consisting of H(βOH), H(βOAc), and O, in which Ac represents an acyl group derived from a carboxylic acid containing from 1 to 12 carbon atoms; and $R_3$ is selected from group consisting of $H_2$, H(αOH), H(αOAc), and O, in which Ac represents an acyl group derived from a carboxylic acid containing from 1 to 12 carbon atoms, in which $R_3$ is $H_2$ when $R_1$ is selected from the group consisting of H(βOH) and O, and $R_3$ is selected from the group consisting of $H_2$, H(αOH), H(αOAc) and O when $R_1$ is $H_2$, which comprises reacting a compound of the formula:

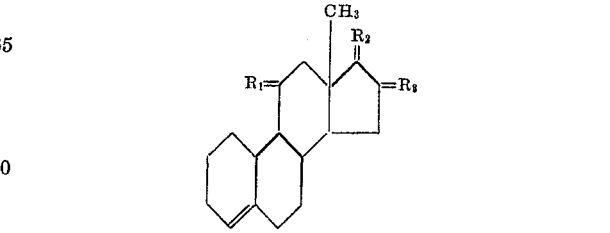

wherein $R_1$, $R_2$, and $R_3$ have the meanings previously given, with anhydrous hydrogen chloride, and treating the thus obtained saturated 5-chloro compound with a basically reacting dehydrohalogenating agent.

2. Compounds of the formula:

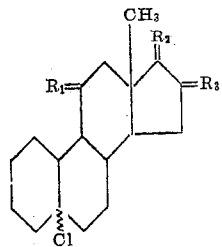

wherein $R_1$ is selected from the group consisting of $H_2$, $H(\beta OH)$, and O; $R_2$ is selected from the group consisting of $\alpha X(\beta Y)$ and O, in which X is selected from the group consisting of hydrogen and a saturated alkyl radical containing from 1 to 6 carbon atoms and Y is selected from the group consisting of a hydroxyl group and an acyloxy group derived from a carboxylic acid containing from 1 to 12 carbon atoms; and $R_3$ is selected from the group consisting of $\beta H(\alpha Y)$ and O, in which Y is selected from the group consisting of hydrogen, a hydroxyl group and an acyloxy group derived from a carboxylic acid containing from 1 to 12 carbon atoms, in which $R_3$ is $H_2$ when $R_1$ is selected from the group consisting of $H(\beta OH)$ and O, and $R_3$ is selected from the group consisting of $H_2$, $H(\alpha OH)$, $H(\alpha OAc)$ and O when $R_1$ is $H_2$.

3. Compounds of the formula:

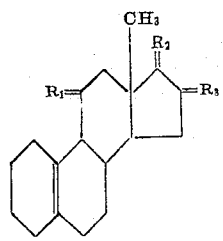

wherein $R_1$ is selected from the group consisting of $H_2$, $H(\beta OH)$, and O; $R_2$ is selected from the group consisting of $\alpha X(\beta Y)$ and O, in which X is selected from the group consisting of hydrogen and a saturated alkyl radical containing from 1 to 6 carbon atoms and Y is selected from the group consisting of a hydroxyl group and an acyloxy group derived from a carboxylic acid containing from 1 to 12 carbon atoms; and $R_3$ is selected from the group consisting of $\beta H(\alpha Y)$ and O, in which Y is selected from the group consisting of hydrogen, a hydroxyl group and an acyloxy group derived from a carboxylic acid containing from 1 to 12 carbon atoms, in which $R_3$ is $H_2$ when $R_1$ is selected from the group consisting of $H(\beta OH)$ and O, and $R_3$ is selected from the group consisting of $H_2$, $H(\alpha OH)$, $H(\alpha OAc)$ and O when $R_1$ is $H_2$.

No references cited.